US008015075B2

(12) United States Patent
Silkey et al.

(10) Patent No.: US 8,015,075 B2
(45) Date of Patent: Sep. 6, 2011

(54) VALUE ADDED BENEFITS FRANCHISING

(75) Inventors: Robert Silkey, San Diego, CA (US); Ted Ricasa, San Diego, CA (US); Thomas Hamann, San Diego, CA (US)

(73) Assignee: Value Added Benefits, Inc., San Diego, CA (US)

( * ) Notice: Subject to any disclaimer, the term of this patent is extended or adjusted under 35 U.S.C. 154(b) by 41 days.

(21) Appl. No.: 12/278,129

(22) PCT Filed: Jan. 25, 2008

(86) PCT No.: PCT/US2008/052101
§ 371 (c)(1),
(2), (4) Date: Aug. 1, 2008

(87) PCT Pub. No.: WO2008/092108
PCT Pub. Date: Jul. 31, 2008

(65) Prior Publication Data
US 2009/0112730 A1    Apr. 30, 2009

(51) Int. Cl.
*G06Q 30/00* (2006.01)
(52) U.S. Cl. .................................. 705/26.41
(58) Field of Classification Search .................. 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 6,105,001 A | * | 8/2000 | Masi et al. | 705/14.1 |
| 6,134,533 A | * | 10/2000 | Shell | 705/26.82 |
| 6,662,164 B1 | * | 12/2003 | Koppelman et al. | 705/14.13 |
| 7,072,843 B2 | | 7/2006 | Menninger | |
| 7,149,707 B2 | * | 12/2006 | Scoble | 705/14.16 |
| 7,505,923 B1 | * | 3/2009 | Yoshioka | 705/26 |
| 2002/0091649 A1 | * | 7/2002 | Anvekar et al. | 705/72 |
| 2002/0156678 A1 | * | 10/2002 | Adams | 705/14 |
| 2003/0126007 A1 | * | 7/2003 | Pavone et al. | 705/10 |
| 2004/0078302 A1 | * | 4/2004 | Cooper et al. | 705/27 |

(Continued)

FOREIGN PATENT DOCUMENTS

KR    10-2001-0000938    1/2001

OTHER PUBLICATIONS

Michael L. Sheffield "Perfect Fit", Entrepreneur, Apr. 28, 2000. Retrieved from http://www.entrepreneur.com/article/printthis/27436.html.*

(Continued)

*Primary Examiner* — Naeem Haq
(74) *Attorney, Agent, or Firm* — Pattric J. Rawlins; Procopio Cory Hargreaves & Savitch LLP

(57) ABSTRACT

Technical systems and related methods for accounting and bookkeeping operations in an ecommerce enterprise combining elements of both franchise and multilevel business operations are provided that allow a franchisor to establish ecommerce franchisees as direct sales agents while maintaining the accounting and bookkeeping functions within the franchisor. The accounting and bookkeeping operational system allows for the use of a multilevel marketing organizational structure within an ecommerce franchise to motivate direct sales agents to make sales while maintaining the accounting functions at the franchisor and providing direct sales agents with the ecommerce sales tools needed to be successful.

5 Claims, 5 Drawing Sheets

U.S. PATENT DOCUMENTS

| | | | |
|---|---|---|---|
| 2004/0122734 A1* | 6/2004 | Schleicher et al. | 705/14 |
| 2004/0199422 A1* | 10/2004 | Napier et al. | 705/14 |
| 2005/0033855 A1* | 2/2005 | Moradi et al. | 709/231 |
| 2005/0049953 A1* | 3/2005 | Vu | 705/36 |
| 2007/0094038 A1 | 4/2007 | Kling et al. | |
| 2007/0265921 A1* | 11/2007 | Rempe et al. | 705/14 |
| 2009/0150232 A1* | 6/2009 | Tyler et al. | 705/14 |
| 2009/0192895 A1* | 7/2009 | Gerichter et al. | 705/14 |
| 2010/0076830 A1* | 3/2010 | Huhem et al. | 705/14.16 |

OTHER PUBLICATIONS

No Author, "Lightyear Wireless Compensation Plan".*

"Business Reference Guide", Amway, 2011, LA1015ENT.*

"The YTB Team Structure & Copyrighted Compensation Plan", YTB, May 2007, P51727 R0711A.*

Anne Coughlan et al. "Network marketing organizations: Compensation plans, retail network growth, and profitability", International Journal of Research in Marketing, 1998, p. 401-426.*

Chris J. Snook "Is Network Marketing and Pyramid Selling the same thing? A layperson's guide to evaluting the pros and cons of this often misunderstood business model.", Business Administration Department, San Diego State University, Fall 2005.*

PCT/US2008/052101, PCT/ISA/237 (Written Opinion).

PCT/US2008/052101, PCT/ISA/210 (International Search Report).

* cited by examiner

| Direct Sales Agent Level | Agent Commission | Franchisee Override |
|---|---|---|
| Franchisee | 30% | 0% |
| Regional manager | 25% | 5% |
| District manager | 20% | 10% |
| Sales manager | 15% | 15% |
| Account executive | 10% | 20% |

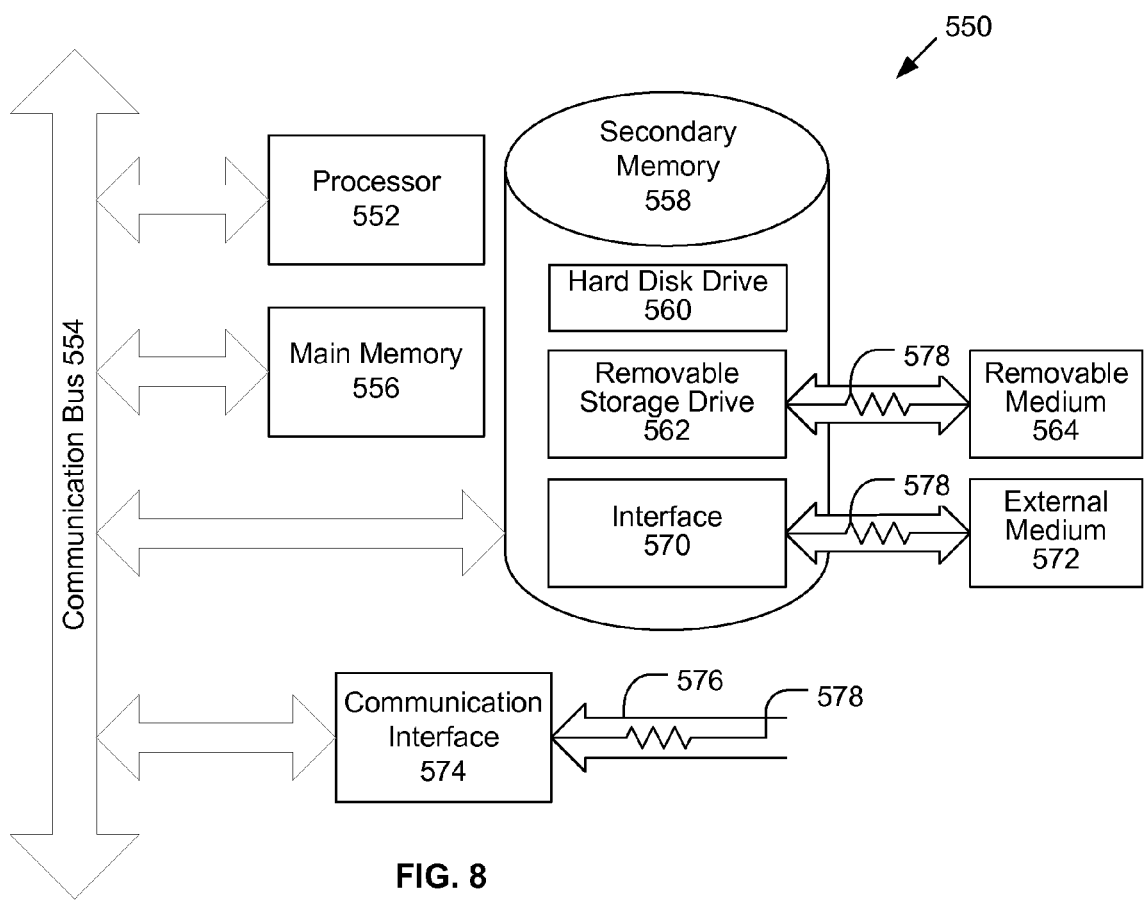

VALUE ADDED BENEFITS FRANCHISING

BACKGROUND

1. Field of the Invention

The present invention generally relates to technical systems for electronic commerce operations and more specifically relates to a technical system for accounting and bookkeeping operations in an electronic commerce enterprise combining elements of both franchise and multilevel business operations.

2. Related Art

Franchise business operations suffer from the significant amount of accounting and bookkeeping that is required on behalf of a franchisee. Conventional franchisees typically must follow strict guidelines related to the use of trademarks and the quality of goods and must also keep accurate accounting records and perform complex bookkeeping for reporting purposes and for payment of franchise fees back to the franchisor. Accordingly, franchise business operations saddle the franchisee with significant accounting and bookkeeping responsibilities that distract the franchisee from sales and therefore diminishes the capability of a franchise to achieve its potential.

Similarly, multilevel marketing business operations suffer from the negative stigma created by illegal pyramid schemes that are often disguised as legitimate multilevel marketing businesses. Multilevel marketing business operations also suffer from the same accounting and bookkeeping responsibilities that are required to enable accurate reporting of sales and profits and appropriate compensation. Therefore, what is needed is a system and method that overcomes these significant problems found in the conventional franchise and multilevel marketing business operations as described above.

SUMMARY

Accordingly, disclosed herein are technical systems and methods for accounting and bookkeeping operations in an electronic commerce ("ecommerce") enterprise combining elements of both franchise and multilevel business operations. The disclosed technical systems and methods allow a franchisor to establish ecommerce franchisees as direct sales agents while maintaining the accounting and bookkeeping functions within the franchisor. The accounting and bookkeeping operational system also enables the use of a multilevel marketing organizational structure within an ecommerce franchise to motivate direct sales agents to make sales while maintaining the accounting functions at the franchisor and providing direct sales agents with the ecommerce sales tools needed to be successful. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 7 is a table diagram illustrating example overrides determined by the accounting and bookkeeping operations of a technical system in an electronic commerce enterprise based on product sales outside of a franchise according to an embodiment of the present invention; and FIG. 8 is a block diagram illustrating an example computer system that may be used in connection with various embodiments described herein.

DETAILED DESCRIPTION

Certain embodiments as disclosed herein provide for technical systems and related methods for accounting and bookkeeping operations in an ecommerce enterprise combining elements of both franchise and multilevel business operations are provided that allow a franchiser to establish ecommerce franchisees as direct sales agents while maintaining the accounting and bookkeeping functions within the franchisor. The accounting and bookkeeping operational system allows for the use of a multilevel marketing organizational structure within an ecommerce franchise to motivate direct sales agents to make sales while maintaining the accounting functions at the franchiser and providing direct sales agents with the ecommerce sales tools needed to be successful.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
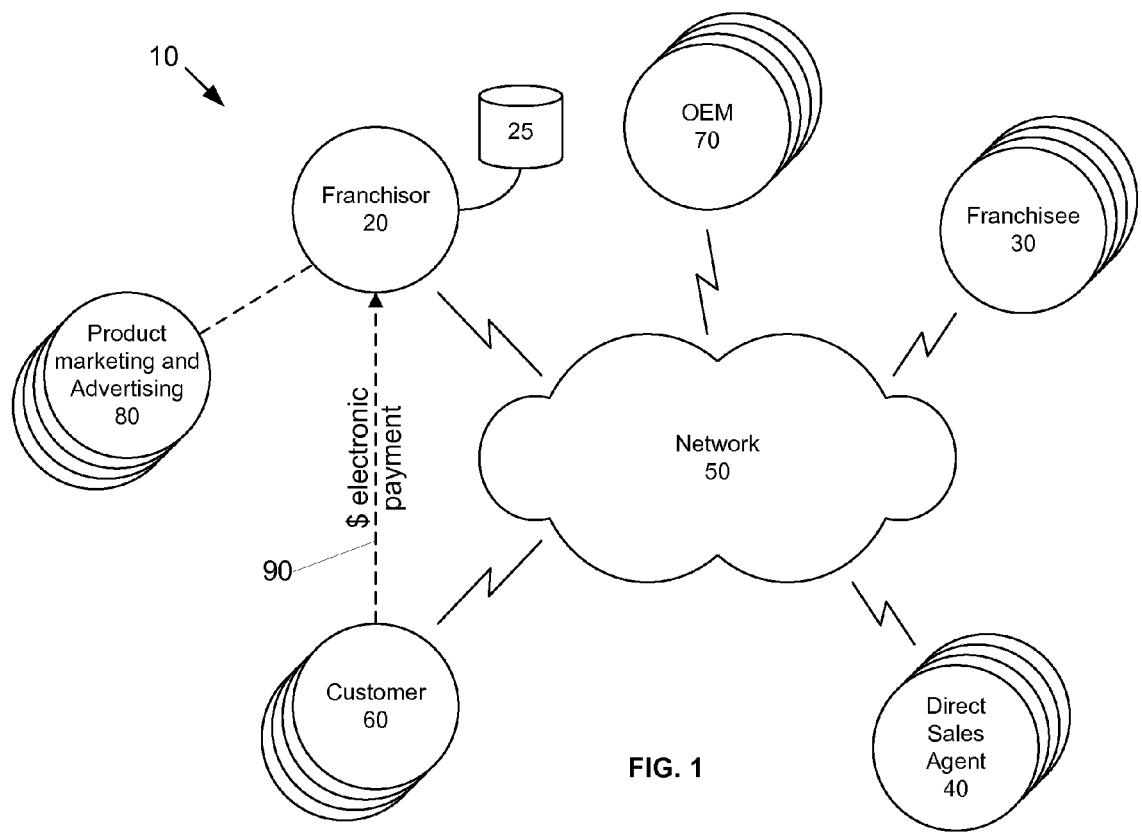
FIG. 1 is a high level network diagram illustrating an example technical system for accounting and bookkeeping operations in an electronic commerce enterprise combining elements of both franchise and multilevel business operations according to an embodiment of the present invention.

FIG. 1 is a high level network diagram illustrating an example technical system for accounting and bookkeeping operations in an electronic commerce enterprise combining elements of both franchise and multilevel business operations according to an embodiment of the present invention. In the illustrated embodiment, the system 10 comprises a franchisor 20 that is communicatively coupled with one or more franchisees 30 and one or more direct sales agents 40 via a communication network 50. For example, the network 50 can be the Internet. Also connected to the network 50 and in communication via the network 50 are one or more customers 60 and one or more product suppliers, distributors, original equipment manufacturers ("OEM") 70. The one or more product marketing and advertising entities 80 may or may not be connected to the network 50 and in communication with the franchisor 20 via the network 50.

In addition to the franchisor 20 and franchisees 30, the technical system 10 is comprised of the major components found in typical business operations. These components include but are not limited to; products and services, accounting, reporting, sales force, suppliers, marketing and advertising, customers service, data storage, etc. The specifics of these various business components are carried out by their respective providers and work cooperatively in the technical system 10. Accordingly, any type of product, service, accounting system, sales model, etc., can be used in conjunction with the illustrated technical system 10.

In practice, the franchisor 20 sells or otherwise establishes one or more franchisees 30 that are prompted through an incentive structure to sell certain products and services. For example such products and services can be tangible goods that are delivered through conventional channels or they can be digital products and/or services that are capable of distribution in electronic form. The products sold by the franchisee 30 may be recurring in nature, such as a monthly subscription, for example magazines, wine, websites or single product purchases such as books or consumer electronics that may be, for example, drop shipped from a product supplier or OEM 70 to the customer 60. In one embodiment, the product generates recurring revenues on a periodic basis.

The product may be sold to a customer 60 directly by the franchisee 30 or alternatively by a direct sales agent 40 that is associated with the franchisee 30. Effectively both the franchisee 30 and any direct sales agents 40 associated with the franchisee 30 are direct sales agents when acting in their capacity to make a direct sale to a customer 60. The customer 60 can purchase the product by interacting with a website that is provided by the franchisee 30 or direct sales agent 40. Once the customer 60 has purchased the product, one or more electronic payments 90 are made directly to the franchisor 20 via conventional electronic payment methods such as credit card, debit card, PayPal, electronic funds transfer, automated clearing house ("ACH"), or any other type of electronic payment or automated means for effecting the transfer of funds from the customer 60 to the franchisor 20 and confirming such transfer. In one embodiment, payment can also be by check or other non-electronic means.

Thus, the technical system 10 includes a franchisor 20, a plurality of franchisees 30 and direct sales agents 40 that are each affiliated with a particular franchise. Customers 60 purchase products via the network 50 from a franchisee 30 or direct sales agent 40 and the payments for such purchases go directly to the franchisor 20 who is responsible for all accounting and bookkeeping functions within the technical system 10 and provides payments to the various franchisees 30 and direct sales agents 40 as appropriate.

Figure 2:
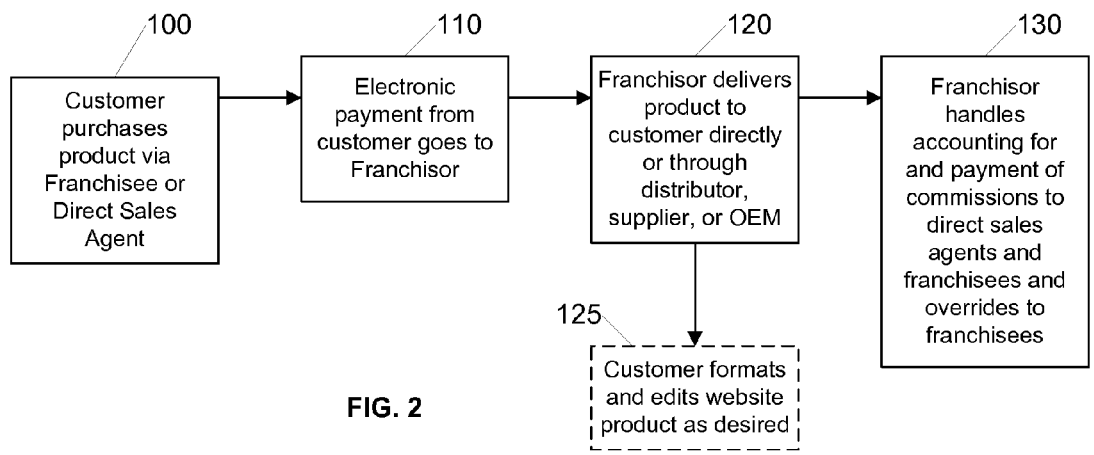
FIG. 2 is a flow diagram illustrating an example method for carrying out accounting and bookkeeping operations in an electronic commerce enterprise combining elements of both franchise and multilevel business operations according to an embodiment of the present invention.

FIG. 2 is a flow diagram illustrating an example method for carrying out accounting and bookkeeping operations in an electronic commerce enterprise combining elements of both franchise and multilevel business operations according to an embodiment of the present invention. The method shown in the illustrated embodiment may be carried out by the technical system described with respect to FIG. 1. The method begins in step 100 with a customer purchasing a product from a direct sales agent or franchisee acting in its capacity as a direct sales agent. The sale of the product may occur via a computer network, for example while the customer is interacting with the website of the franchisee or the website of the direct sales agent. The sale may also take place via alternative networks such as a telephone network or other alternative sales channels.

Next, in step 110 the customer makes payment for the purchased product. The payment goes directly to the franchisor and in the case of a recurring revenue stream product, the customer provides electronic payment information so that the recurring payments may be automatically processed by the franchisor on a regular basis.

Next, in step 120 the franchisor delivers the product to the customer. For example, digital products can be delivered to the customer via a computer network while tangible products can be delivered to the customer through more conventional channels such as the postal service or specialty carrier. Alternatively, the product(s) can be delivered to the customer by the franchisee or direct sales agent. The product(s) can also be delivered to the customer by an OEM, for example, by direct shipment (physically or digitally).

Next, in step 130 the franchisor handles all of the accounting and bookkeeping with respect to the sale of all products to all customers that were made by each franchisee and their associated direct sales agents. Advantageously, this handling of the accounting by the franchisor eliminates the bookkeeping function from the franchisee, thereby allowing them and their direct sales agents to focus on product sales rather than administrative responsibilities. Furthermore, the franchisor effects the payment of commissions to the franchisees and direct sales agents and the payment of overrides to franchisees. An override is a separate commission paid to a franchisee when a direct sales agent associated with the franchisee makes the sale to a customer.

On an ongoing basis, the franchisor charges recurring periodic payments for products and services to the various customers using the electronic payment information initially provided by those customers when the product or service was purchased. The franchisor also makes ongoing commissions and override payments to the franchisees and direct sales agents as appropriate based upon the accounting and bookkeeping function that is carried out by the franchisor.

Note that in the embodiment where the product being sold is a digital product such as a customizable website, in step 125, after the franchisor has delivered the product(s) to the customer, the customer is able to format and edit the website product as desired. This is shown to illustrate that the customer is able to enjoy use of the product or service on an ongoing basis while the franchisor remains responsible for the accounting and bookkeeping functions in the technical system.

Figure 3:
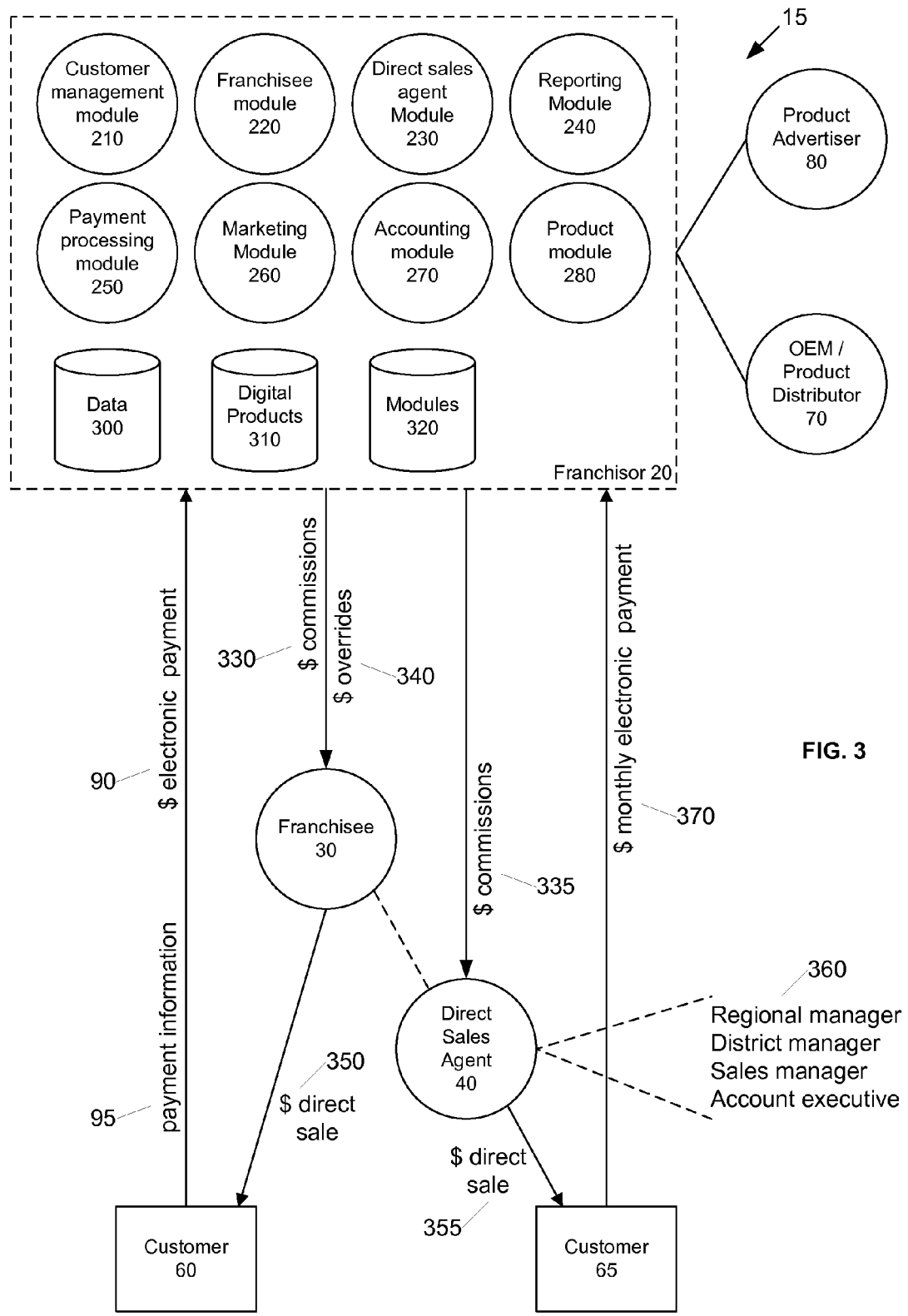
FIG. 3 is a block diagram illustrating and example technical system for accounting and bookkeeping operations in an electronic commerce enterprise combining elements of both franchise and multilevel business operations and modular elements of the example system according to an embodiment of the present invention.

FIG. 3 is a block diagram illustrating and example technical system 15 for accounting and bookkeeping operations in an electronic commerce enterprise combining elements of both franchise and multilevel business operations and modular elements of the system 15 according to an embodiment of the present invention. In the illustrated embodiment, the franchisor 20 has a plurality of modules that carry out the functions associated with the technical system. These include modules for customer management 210, franchisee 220, direct sales agent 40 230, reporting 240, payment processing 250, marketing 260, accounting 270, and product distribution 280. The various functions in the illustrated modules can be combined or separated into one or more modules in alternative embodiments.

The franchisor 20 is also configured with one or more data storage areas 300, 310, and 320 that house the various functional modules (when implemented at least partially in software) and also house data associated with these functional modules (e.g., sales information, franchise information, franchise association information for direct sales agent 40s, etc.). The one or more data storage areas 300, 310, and 320 can also include the product itself when the product is a digital product.

In one embodiment, the customer 60 management module 210 is configured to set up new customer 60 accounts, obtain payment processing information and customer 60 profile information and the like. For example, the customer 60 management module 210 may interact with the customer 60 during the sales process to provide the customer 60 with a login and password that can be used by the customer 60 to create, edit, and maintain purchased digital products such as software, music, movies, and the like.

The franchisee module 220 is configured to allow a franchisee 30 to access assistance and other materials that are beneficial to the running of a franchise operation. The franchisee module 220 can also interact with the reporting module 240 and accounting module 270 as needed to provide a franchisee 30 with historical information and projections regarding the payments of commissions 330/335 and overrides 340, product sales 350/355, and other information pertinent to the particular franchise. The direct sales agent module 230 is similarly configured to provide information to a direct sales agent 40 that is beneficial in assisting the direct sales agent 40 in its endeavor to sell product. The information provided may be separated out according to the particular level 360 of the direct sales agent 40, which in the illustrated embodiment may be one of account executive, sales manager, district manager, and regional manager. The reporting module 240 is configured to analyze historical data and provide reports related to product sales 350/355 and related commissions 330/335 and overrides 340. The reporting module 240 can also provide projections regarding expected sales and commissions 330/335/overrides 340 based on assumptions or historical performance. The reporting module 240 may interact with the accounting module 270 to provide this information.

The payment processing module 250 is configured to interact with a customer 60 and collect payment information 95 and execute the payment transaction 90 to realize the exchange of funds from the customer 60 to the franchisor 20 for purchase of a product or service or an ongoing periodic fee 370 related to continued use of a product or service. The marketing module 260 is configured to provide marketing information to the franchisor 20 and where appropriate to franchisees 30 and direct sales agents 40 (through their respective modules). The marketing module 260 can also interact with the accounting module 270 to set aside portions of franchisee 30 commissions 330/335 or overrides 340 that are to be collectively contributed by franchisees 30 to pay for common marketing efforts that are arranged by the franchisor 20. The marketing module 260 may also be used by the franchisor 20 to establish and carry out certain marketing campaigns that are provided via network or other media outlets. The marketing campaigns may also be deployed by the franchisor 20 on each of the various franchisee 30 and direct sales agent 40 websites so that each franchisee 30 and direct sales agent 40 has the most current marketing materials automatically displayed on their respective websites.

The accounting module 270 is configured to track all of the sales 350/355 made by direct sales agents 40 and franchisees 30 and also track the relationship between direct sales agent 40 and franchisee 30 including any interstitial relationships, for example franchisee→regional manager→district manager→sales manager→account executive, so that the appropriate parties are compensated for each sale. Additionally, the accounting module 270 can interact with the payment processing module 250 to effect commission and override payments to the franchisees 30 and direct sales agents 40 as appropriate. The accounting module 270 may also interact with the reporting module 240 and the marketing module 260 as previously described.

The product module 280 is configured to deliver product to a purchasing customer 60. Product can be delivered directly by the franchisor 20 or it may be delivered through a third party such as a distributor or manufacturer 70. Digital products can advantageously be delivered via network while tangible products can be delivered through conventional channels such as the postal service, Federal Express, or United Parcel Service.

For example, in the case where the product is a single digital or tangible product, the product distribution module 280 is configured to effect distribution of the product by download (for digital products) or by shipping, either directly from the franchisor 20 or through an OEM 70 or other manufacturer or distributor 70. Alternatively, in the case of the website product or other recurring types of services or products, the product distribution module effectively becomes an ongoing portal for the customer 60 to interact with the purchased product or service and does not just perform the function of distribution of the product to the customer 60.

Figure 4:
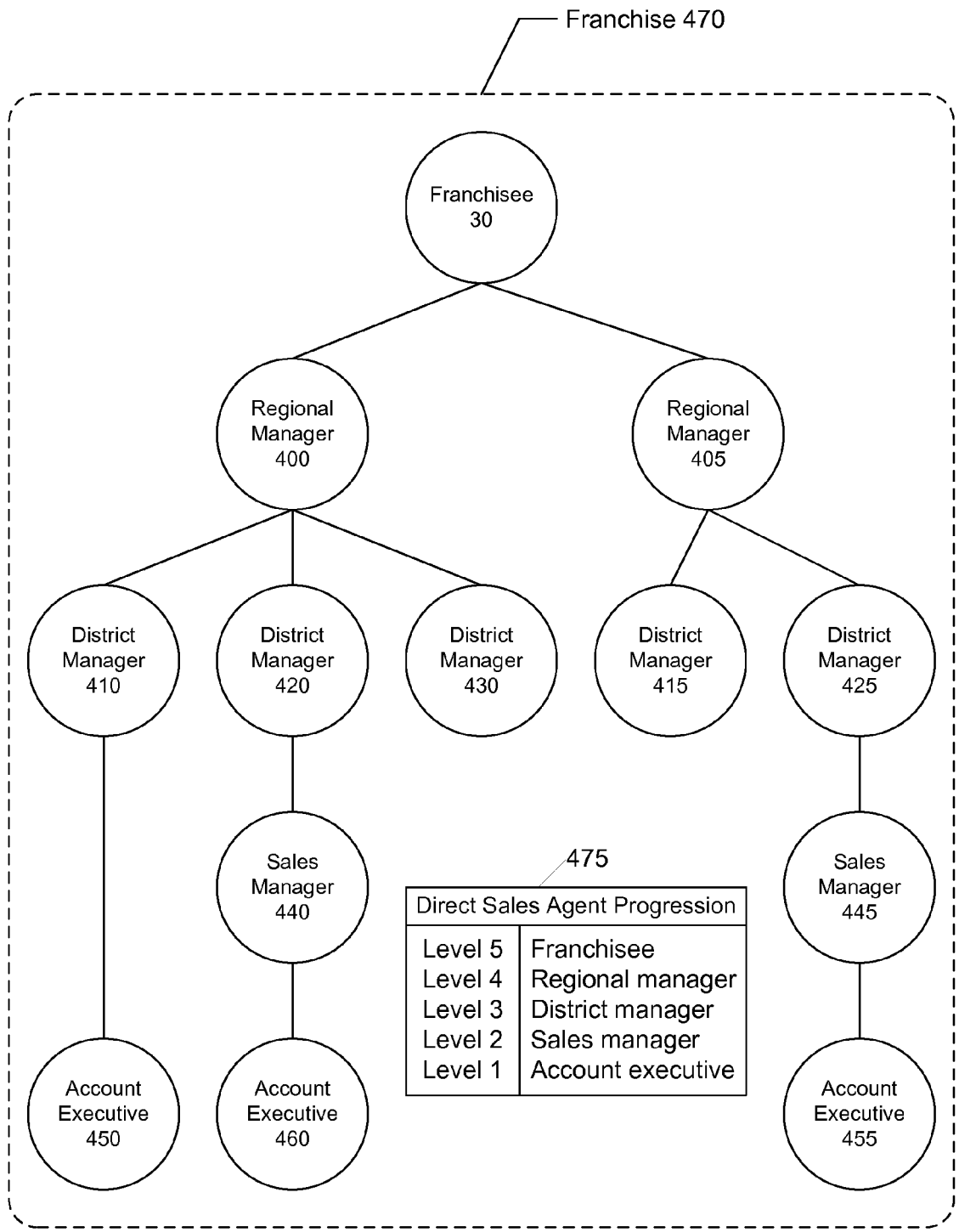
FIG. 4 is an operational diagram illustrating an example single franchise multilevel business operational structure used in determining commission payments to direct sales agents and override payments to a franchisee in a technical system according to an embodiment of the present invention.

FIG. 4 is an operational diagram illustrating an example electronic commerce franchise 470 with multilevel business operational structure 475 in a technical system according to an embodiment of the present invention. In the illustrated embodiment, the franchise 470 comprises a franchisee 30 and then various levels of direct sales agents under the franchisee 30. The direct sales agents are all associated with the franchisee 30 according to the franchisor. This association can be established, for example, by the franchisee 30 bringing the direct sales agent into the franchise 470 and setting up the direct sales agent through the franchisee 30 website.

Although any number of levels of direct sales agents may be employed, in the illustrated embodiment there are four levels cascading down from regional manager to district manager to sales manager to account executive. Note that the franchisee 30 may have a direct hierarchical relationship line between the franchisee 30 and any level of direct sales agent, for example an account executive 450/460/455 that is brought in by the franchisee 30. As shown, the two sales managers 440/445 were brought in by their respective district managers 420/425, for example. Additionally, lateral relationship lines may also be present in the hierarchy, for example when an account executive brings in another account executive. In such a case, second account executive may outperform his sponsor and in such a case the hierarchical relationship lines may flow in the reverse direction.

Advantageously, all new direct sales agents of a franchise 470 are brought in at the lowest level and these low level direct sales agents are able to move up through the hierarchy of direct sales agents within the franchise 470 organization by increasing direct sales and indirect sales. Direct sales for a first direct sales agent are those sales made through the website of the first direct sales agent while indirect sales for the first direct sales agent are those sales made through the website of a second direct sales agent that is associated with the first direct sales agent (either directly or indirectly).

In one embodiment, a direct sales agent at the highest level within the franchise 470 may "earn" a separate franchise (not shown) by meeting certain performance criteria. When this happens, the new franchise that is earned (in this case by a regional manager) can either remain associated with the parent franchise 470 or the new franchise can be disassociated from the parent franchise 470. In the case where the association continues, certain overrides may continue to be paid to the parent franchise. In the case where the association is severed, no continuing overrides are paid to the parent franchise, but overrides may still be paid to a grandparent franchise if such a relationship exists.

Figures 5, 6:
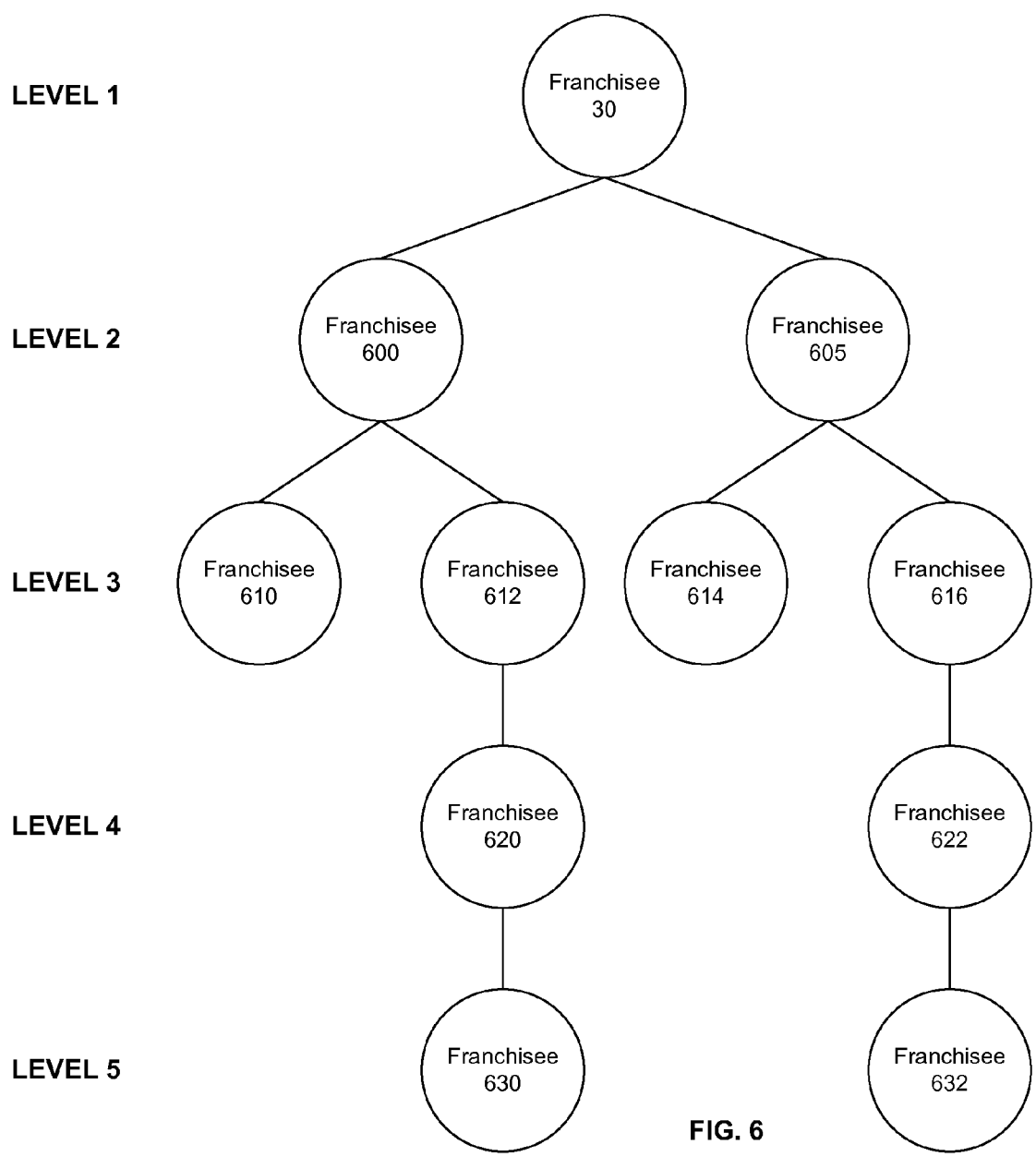
FIG. 5 is a table diagram illustrating example commissions and overrides determined by the accounting and bookkeeping operations of a technical system in an electronic commerce enterprise based on product sales within a single franchise multilevel business operational structure according to an embodiment of the present invention.
FIG. 6 is an operational diagram illustrating an example multiple franchise operational structure used in determining override payments to a franchisee in a technical system according to an embodiment of the present invention.

FIG. 5 is a table 500 diagram illustrating example commissions and overrides implemented by the accounting and bookkeeping operations of a technical system in an electronic commerce enterprise combining elements of both franchise and multilevel business operations according to an embodiment of the present invention. Note that the present table 500 is by way of example only and is provided as a simple example to explain the accounting and bookkeeping operation of this aspect of one embodiment of the technical system.

In the illustrated embodiment, commissions are paid by the franchisor at a total rate of 30% for each sale. For example, when the franchisee makes a direct sale, the franchisee gets a 30% sales commission. Within the franchise, the total commission percentage can be divided up between the direct sales agent, any intermediate agents, and the franchisee. In the simple case, where each direct sales agent was directly brought into the franchise by the franchisee, for those sales made directly by a regional manager direct sales agent, the regional manager gets a 25% commission and the franchisee gets a 5% commission (referred to as an override). Similarly, a district manager gets a 20% commission and the franchisee gets a 10% override and a sales manager gets a 15% commission and the franchisee also gets a 15% override. Finally, an account executive gets a 10% commission and the franchisee gets a 20% override.

Although not shown, in a more complex hierarchy, the commission percentages may be paid to more than just the franchisee and a single direct sales agent. For example, if the direct sale was made by an account executive who was brought into the franchise by a sales manager who in turn was brought in by a district manager who in turn was brought in by a regional manager, who in turn was brought in by the franchisee, then the breakdown might be 10% to the account executive for the direct sale, 8% to the sales manager, 6% to the district manager, 4% to the regional manager, and 2% to the franchisee. Alternative percentages to the various levels may also be employed, for example 10% to the account executive and 5% each to the other managers and the franchisee. Or 10% to the account executive and the franchisee with 5%, 3%, and 2% respectively to the sales manager, district manager, and regional manager. Alternative schemes may also be employed that account for the various hierarchical relationships between the agent making the direct sale and ultimately the franchisee.

FIG. 6 is an operational diagram illustrating an example multiple franchise operational structure used in determining override payments to a franchisee in a technical system according to an embodiment of the present invention. In the illustrated embodiment, the operational structure includes five levels of franchises, although in practice more or fewer levels may be employed. As shown, franchisee 30 referred franchisee 600 and franchisee 605 into the multiple franchise enterprise. In turn, franchisee 600 brought in franchisees 610 and 612, while franchisee 605 brought in franchisees 614 and 616. Also, franchisee 612 brought in franchisee 620 who referred franchise 630 and franchisee 616 brought in franchisee 622 who referred franchise 632.

These referral relationships are maintained by the franchisor, for example by the franchisee module. Advantageously, these hierarchical relationships can be used to calculate and determine the various overrides that are paid to a franchisee for sales outside of the franchisee's direct operational structure. Notably, this provides a franchisee with a second source of revenue that prior to the present invention was not available to a franchisee. In one embodiment, when a direct sales agent earns a new franchise, that new franchise is tracked by the franchisor (e.g., through the franchisee module) as being a subsequent level franchise to the franchise that the direct sales agent was previously part of.

FIG. 7 is a table 700 diagram illustrating example overrides determined by the accounting and bookkeeping operations of a technical system in an electronic commerce enterprise based on product sales outside of a franchise according to an embodiment of the present invention. In the illustrated embodiment, the level 1 franchise earns overrides of 5% on all product sales made by any level 2 franchise with a hierarchical relationship to the level 1 franchise. Referring back to FIG. 6, for example, franchisee 30 earns a 5% override on all product sales made directly or indirectly by franchisees 600 and 605. Similarly, according to the embodiment in table 700, franchisee 30 also earns a 4% override on all product sales made directly or indirectly by franchisees 610, 612, 614, and 616. Continuing down the levels, franchisee 30 earns a 3% override on product sales at level 3, a 2% override on product sales at level 4, a 1% override on product sales at level 5, a 0.5% override on product sales at level 6, and a 0.25% override on product sales at level 7. As previously state, there may be more or fewer levels.

Advantageously to the franchisees, the franchisor is responsible for all of the complicated hierarchical relationship tracking and attendant accounting and bookkeeping functions including the calculation of the various commissions and overrides associated with each individual sale of a product and associated with each recurring payment by a customer for an ongoing service or product/license renewal. This allows the franchisees to focus their efforts on making direct sales as well as building out the distribution network by bringing in new direct sales agents and new franchises.

FIG. 8 is a block diagram illustrating an example computer system 550 that may be used in connection with various embodiments described herein. For example, the computer system 550 may be used in conjunction with a franchisor, franchisee, or direct sales agent as previously described with respect to FIGS. 1 and 3. However, other computer systems and/or architectures may also be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described Figs. and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

The invention claimed is:

1. A technical system for improved accounting and bookkeeping operations in an electronic commerce enterprise, the technical system comprising:
   a franchisor configured to grant a franchise to a franchisee, the franchisor comprising:
      a computer readable storage medium for storing computer executable programmed modules;
      a processor communicatively coupled with the computer readable storage medium for executing programmed modules stored therein;
      a payment processing module stored in the computer readable storage medium and configured to collect information from a customer via a communication network and process electronic payments for said franchisor products via a communication network;
      a franchisee module stored in the computer readable storage medium and configured to track hierarchical relationships between franchises;
      an accounting module stored in the computer readable storage medium and configured to determine a commission amount for direct sales and an override amount for indirect sales and initiate payment of said commissions and said overrides and wherein the accounting module is further configured to determine an override amount for direct sales made within a first franchise and initiate payment of said override amount to a second franchise having a hierarchical relationship to said first franchise; and
   a franchisee configured to make sales of franchisor products directly to customers and indirectly to customers via one or more direct sales agents.

2. The technical system of claim 1, wherein the franchisor further comprises a product module stored in the computer readable storage medium and configured to deliver a franchisor product to the customer via a communication network.

3. The technical system of claim 1, wherein the franchisee comprises a multilevel business operational structure wherein direct sales agents have hierarchical relationships within a single franchise.

4. A computer implemented method for improved accounting and bookkeeping operations in an electronic commerce enterprise, where one or more processors are programmed to perform steps comprising:
   using one or more processors to perform steps comprising:
      receiving from a customer a request to purchase a product via a communication network;
      identifying a direct sales agent associated with said request to purchase the product, wherein the direct sales agent is a first franchisee or is associated with a franchisee;
      obtaining payment information from the customer via said network;
      processing a payment transaction to complete the sale of the product to the customer;
      determining if the direct sales agent is the first franchisee;
      paying a first commission to the direct sales agent if the direct sales agent is the first franchisee;
      paying a second commission to the direct sales agent if the direct sales agent is not the first franchisee;
      paying a first override to the first franchisee if the direct sales agent is not the first franchisee;
      determining if the first franchisee is associated with a second franchisee; and
      paying a second override to the second franchisee if the first franchisee is associated with the second franchisee.

5. A computer implemented method for improved accounting and bookkeeping operations in an electronic commerce enterprise, where one or more processors are programmed to perform steps comprising:
   using one or more processors to perform steps comprising:
      receiving from a customer a request to purchase a product via a communication network;
      identifying a direct sales agent associated with said request to purchase the product, wherein the direct sales agent is a first franchisee or is associated with a franchisee;
      obtaining payment information from the customer via said network;
      processing a payment transaction to complete the sale of the product to the customer;
      determining if the direct sales agent is the first franchisee;
      paying a first commission to the direct sales agent if the direct sales agent is the first franchisee;

paying a second commission to the direct sales agent if the direct sales agent is not the first franchisee;
paying a first override to the first franchisee if the direct sales agent is not the first franchisee;
determining if the first franchisee is associated with a second franchisee;

paying a second override to the second franchisee if the first franchisee is associated with the second franchisee; and delivering the product to the customer via said network.

* * * * *